Jan. 16, 1945. H. KÜNZER 2,367,465
GYROSCOPIC INSTRUMENT
Filed Oct. 3, 1939 4 Sheets-Sheet 1

Inventor
Heinrich Künzer:
By Bailey & Carson
Attorneys

Jan. 16, 1945. H. KÜNZER 2,367,465
GYROSCOPIC INSTRUMENT
Filed Oct. 3, 1939 4 Sheets-Sheet 2

Inventor
Heinrich Künzer:
By Bailey & Carson
Attorneys

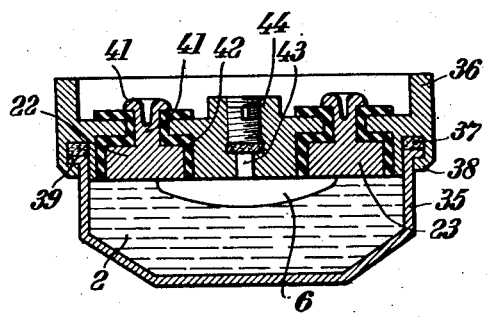
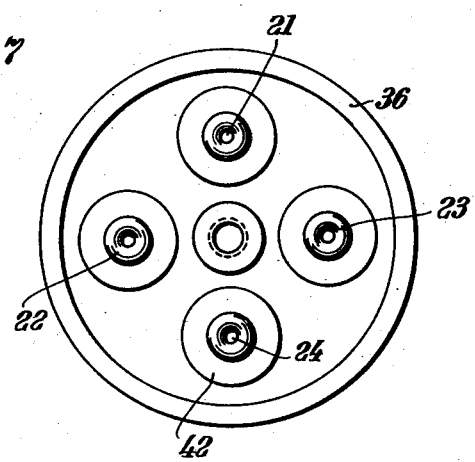

Patented Jan. 16, 1945

2,367,465

UNITED STATES PATENT OFFICE 2,367,465

GYROSCOPIC INSTRUMENT

Heinrich Künzer, Kiel, Germany; vested in the Alien Property Custodian

Application October 3, 1939, Serial No. 297,760
In Germany August 4, 1938

7 Claims. (Cl. 201—57)

My invention relates to a gyroscopic instrument of the type in which a device controlled by one or more gravity-responsive elements is adapted to exert a torque on the gyroscope causing the same to perform a precessional motion whereby the gyroscope is brought to a predetermined position.

Gyroscopic instruments of this type are widely used in aviation for the purpose of navigation.

More particularly, my invention relates to a device of this kind known as the "artificial horizon." In this instrument, the gyroscope is mounted in neutral equilibrium on horizontal axes and its spinning axis is maintained in the direction of gravity by the application of torques which are rendered effective about the horizontal axes of suspension and are controlled by gravity-responsive elements such as pendulums, whereby the gyroscope is directly restored to the vertical without oscillation if it should temporarily depart therefrom. As the gyroscope responds to such torques very slowly, it gives an indication of the horizon by an integration of the varying directions of the apparent gravity.

However, my invention is equally applicable to a course indicator comprising a gyroscope mounted in neutral equilibrium and provided with means holding its spinning axis in horizontal position. These means exert a torque on the gyroscope whenever the same departs from the horizontal position causing the gyroscope to perform a precessional movement whereby it is returned to the horizontal position.

The primary object of my invention is to provide an instrument of the character explained which is very accurate and reliable in operation, simple in its design and free from electrical contacts or amplifying devices.

Another object is the provision of gravity-responsive means which are adapted to control an electric current and are extremely sensitive.

These and other objects are attained by the use, as the gravity-responsive element, of a level which controls an electric current operating the torque-producing device. The level constitutes a continuously variable electrical resistance which is free from any contacts or any moving elements subject to wear. The liquid contained in the level controls the electric current energizing the torque producer and represents itself the gravity-responsive element. Preferably, the liquid constitutes the variable resistance which will continuously vary the energization of the torque producer in accordance with the requirements. This has the advantage over pendulum-controlled contacts that radio disturbances are avoided which are liable to be occasioned by contacts.

I may use a single level for the simultaneous control of the two torque producers of an artificial horizon thus obtaining an instrument of unexcelled simplicity.

Further objects and features of my invention will appear from the description of some preferred embodiments following hereinafter. The features of novelty will be pointed out in the claims.

In the drawings,

Fig. 6 illustrates a vertical section through the level shown in Fig. 5;

Fig. 7 is a plan view of Fig. 6;

Figure 3:
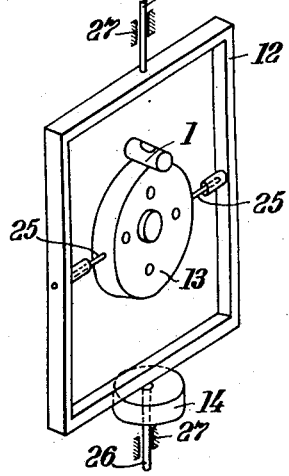
Fig. 3 is a diagrammatic perspective view of a direction indicator provided with the level of Fig. 1.

The instrument illustrated in Fig. 3 may be set to indicate a predetermined azimuth and will then maintain the setting irrespective of accelerations or other influences to which the instrument may be subjected. Therefore, it may be used on an aircraft to indicate a predetermined direction while the aircraft performs complicated maneuvers. It comprises a gyroscope having a horizontal spinning axis which is supported by a carrier in form of a housing 13 and is driven in a known manner, for instance, by an electrical induction motor. The housing 13 is provided with trunnions 25 having a common horizontal axis extending at right angles to that of the gyroscope. The trunnions 25 are journalled within a gimbal ring 12 provided with vertical trunnions 26 journalled in bearings 27 attached to the frame of the instrument. One of the trunnions 26 carries an indicator which may be set by the pilot to a predetermined position before the aircraft enters into complicated maneuvers and which will then retain the set direction. The axis of the trunnions 25 intersects the axis of the trunnions 26 at the common center of gravity of the carrier 13 and of the gyroscope whereby the latter is suspended in neutral equilibrium.

As the gyroscope is subject to couples produced by friction of the trunnions 25 and 26 in their bearings and by the earth's rotation, it tends to gradually depart from the horizontal position and might eventually arrive in a vertical position in which it could no longer stabilize the frame 12. In order to prevent that, means are provided exerting a torque on the frame 12 about the axis of the trunnions 26 whenever the spinning axis of the gyroscope tends to depart from horizontal position. This torque causes the gyroscope to perform a slow precessional movement about the axis of the trunnions 25 whereby it returns to horizontal position.

In known instruments of this kind the torque is produced by the reaction of air jets. In cold weather, however, ice may form within the air conduits and may plug the same. Therefore, it is an object of my invention to provide improved control means for the torque producers which are not sensitive to cold weather.

To this end, I have mounted a level 1 on top of the gyroscope carrier 13. This level acts as a variable electrical resistance controlling the energization of an electrical torque producer 14 interposed between the lower bearing 27 and the trunnion 26. The torque producer may be formed by a reversible induction motor operated by alternating current, the stator thereof being attached to the frame 12 and the rotor being fixed to the trunnion 26.

Figure 1:
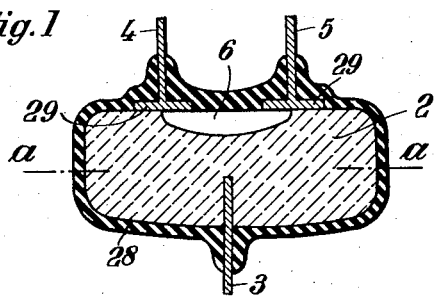
Fig. 1 is a vertical section through my improved current-controlling level.

In Fig. 1 I have shown a vertical section through the level 1. It comprises a sealed housing 28 of insulating material having a substantially cylindrical shape which is suitably attached on top of the gyroscope carrier 13 and includes a conductive liquid 2. However, a bubble 6 is left which may consist of air, gas or some other insulating medium, such as oil. The bottom of the housing 28 is provided with a bore through which an electrode 3 extends projecting a certain distance into the liquid 2. In the cover of the housing 28 two electrodes 4 and 5 are inserted at a distance which is less than the diameter of the bubble 6. The electrodes 4 and 5 have interior heads 29 which are partly covered by the bubble 6 when the level is in normal position. Preferably, the liquid 2 acts as a variable electrical resistance. For this purpose, it may be formed by a salt-containing solution of limited conductivity. In order to lower the freezing point, alcohol may be added thereto.

I have mentioned above that the torque producer is preferably formed by an induction motor energized by alternating current and provided with two windings counteracting one another. The relative energization of these two windings determines the direction and the rate of the torque produced. One terminal of each winding is connected with the electrode 4, or 5 respectively, and the other terminal is connected with one pole of the source of current, while the other pole thereof is connected with the electrode 3.

The operation is as follows: As long as the air bubble assumes the central position shown in Fig. 1, the paths of current extending from the electrode 3 through the resistive liquid 2 to the electrodes 4 and 5 have the same length and the same resistance. Consequently, the two counteracting windings of the motor 14 are equally energized and balance one another so that the motor produces no torque on the gimbal ring 2.

As soon, however, as the direction of the apparent gravity has a component acting in the direction a—a, which occurs upon departure of the spinning axis of the gyroscope from the horizontal plane, the air bubble 6 moves in the opposite direction. Assuming that it moves towards the right with reference to Fig. 1, the area of contact between the electrode 4 and the liquid will increase while the area of contact between the electrode 5 and the liquid decreases. This has the effect of shortening the path of current between the electrodes 3 and 4 while the path between the electrodes 3 and 5 becomes longer. Hence, the two counteracting windings will no longer balance each other but the energization of one winding will overcome that of the other and will produce a torque on the gimbal ring 12 which is substantially in proportion to the departure of the bubble 6 from its central position. The torque thus produced causes the gyroscope to perform a precessional motion about the axis of the trunnions 25. This precessional motion returns the spinning axis of the gyroscope to the horizontal plane at a very slow speed.

The longitudinal profile of the housing 28 is preferably straight near the center and curved near the ends thereof. Therefore, the bubble 6 will depart from its central position an amount which, with increasing inclination of the level, increases less than in proportion therewith.

Figure 2:
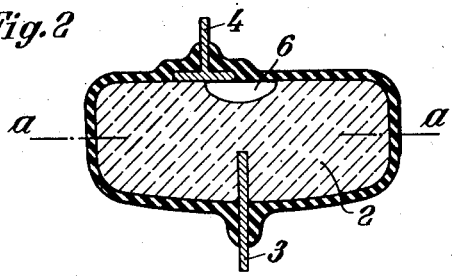
Fig. 2 shows a vertical section through a modification.

The invention is capable of numerous modifications. In Fig. 2 I have illustrated an embodiment in which the electrode 5 has been omitted. In this embodiment, one of the two opposed windings of the motor 14 is arranged in series with the electrode 4, whereas the other winding is permanently energized. The two windings, however, are so differently proportioned that the maximum energization of the level-controlled winding is substantially more powerful than that of the other winding.

In the normal position illustrated in Fig. 2 the bubble 6 covers half of the surface of the electrode 4. Under these circumstances, the level-controlled winding is so energized as to balance the constant winding thus producing no torque. A torque in one or the other direction will be produced, however, when the air bubble 6 departs in one or the other direction from the center.

The cover of the housing 28 may be so profiled that the departure of the bubble 6 from the center will be in proportion to the inclination of the level to the direction of the apparent gravity. In this event, the level will be less sensitive which may be desirable under certain circumstances.

While in the embodiments described hereinabove the liquid of the level constitutes the variable resistance, I may modify the arrangement by making the electrode heads 29 of an electrical resistance material while a liquid of high conductivity is chosen. The heads 29 may consist of a core of copper, for instance, covered by a lining of a suitable resistance material, such as a mixture of rubber and finely ground graphite. The liquid may be mercury. The larger the area of the head 29 is that is covered by the mercury, the more powerful will be the current flowing through the electrode.

Figure 4:
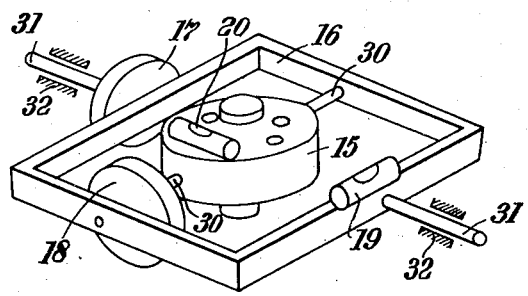
Fig. 4 is a diagrammatic perspective view of an artificial horizon provided with two current-controlling levels.

In Fig. 4 I have shown an artificial horizon to which my invention has been applied. The gyroscope carrier 15 is formed by a housing enclosing a gyroscope having a vertical axis. The instrument serves the purpose of indicating a fixed horizontal plane with respect to the earth's surface during maneuvers in which the direction of the apparent gravity departs from the true vertical. Horizontal trunnions 30 of the carrier 15 are journalled in a horizontal gimbal ring 16 which, in its turn, is provided with trunnions 31 supported in bearings 32 attached to the frame of the instrument, the axis of the trunnions 31 extending at right angles to that of the trunnions 30 and intersecting the same at the common center of gravity of the gyroscope and of its carrier 15. Hence, the gyroscope is mounted in neutral equilibrium.

In the absence of the auxiliary equipment to be described hereinafter, the gyroscope would slowly depart from vertical position under effect of the friction of the trunnions 30 and 31 in their bearings and under effect of the earth's rotation. In order to prevent such departure, suitable torques are produced on the trunnions 30 and 31 causing the gyroscope to perform precessional motions returning it to vertical position. To this end, a torque producer 17 is interposed between the trunnion 31 and the gimbal ring 17 and a second torque producer 18 is inserted between the trunnion 30 and the gimbal ring 16. In other words, the gimbal ring which constitutes the means for mounting the gyroscope in neutral equilibrium is connected with the stator of the torque producer 18 and with the rotor of the torque producer 17, while the stator of the latter is attached to the bearing 32; the rotor of the torque producer 18, however, is attached to the trunnion 30. In known instruments of this kind the torque producers were controlled by pendulums actuating contacts. In lieu of such pendulums which are subject to wear and are liable to produce radio disturbances, I have provided two levels 19 and 20, the level 19 being mounted on the gimbal ring 16 so as to respond to oscillations thereof about the trunnions 31, while the other level 20 is mounted on the gyroscope carrier 15 so as to respond to rotations thereof about the trunnions 30. The level 19 controls the torque producer 18 and the level 20 controls the torque producer 17 in the manner described hereinabove with reference to Figs. 1 and 2.

Figure 5:
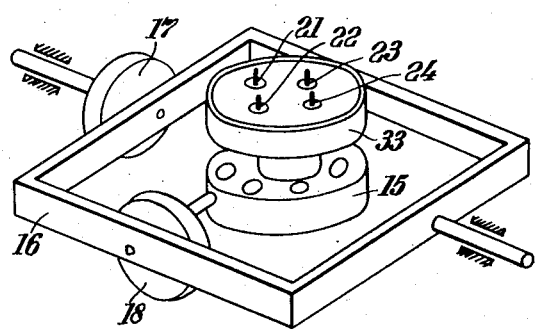
Fig. 5 is a similar view of a modified artificial horizon provided with a single level.

A considerable simplification of the instrument results from the provision of a single level for the control of the two torque producers. This is illustrated in Figs. 5 to 7. The level 33 mounted on top of the gyroscope carrier 15 is formed by a capsule having a round cover provided with two opposed pairs of electrodes 21, 22 and 23, 24. These electrodes control the two torque producers 17 and 18.

In Fig. 6 I have shown a vertical section through the level 33. It comprises a circular cup 35 of sheet metal provided with a metal cover 36. Preferably, the cover 36 has a circumferential groove engaging over the rim of the cup 35 and containing a suitable sealing material 37. The outer wall of this groove is bent inwardly as shown at 38 to engage over a flange 39 of the cup 35. In this manner, the cup may be effectively sealed in a very simple manner. The four electrodes 21, 22, 23 and 24 are inserted in suitable openings of the cover 36 and are suitably attached therein. To this end, each electrode may be provided with a reduced upper pin 40 which is rivetted in place as shown at 41. Each electrode is surrounded by a suitable bushing 42 of insulating material.

The cover 36 is provided with a central opening 43 through which the level may be filled with the liquid 2. The opening 43 is then closed by a threaded plug 44 and a suitable washer. If desired, the level shown in Fig. 6 could be so modified that the continuously variable resistances would be formed by the electrodes rather than by the liquid, as above described with reference to Figs. 1 and 2.

Figure 9:
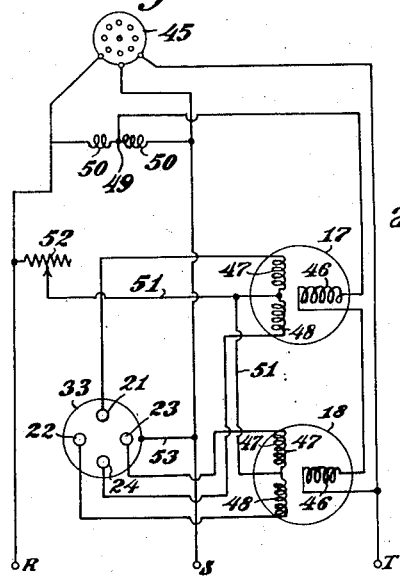
Fig. 9 shows the circuit arrangement of the instrument illustrated in Figs. 5 and 8.

In Fig. 9 I have shown the electrical circuit arrangement of the instrument illustrated in Fig. 5. The gyroscope is driven by an induction motor 45 connected to the three phases R, S and T of a source of three-phase alternating current of a frequency of 300–500 cycles per second. A current of this kind will not attack the liquid and the electrodes by electrolysis. Each of the two torque producers 17 and 18 is constituted by a reversible induction motor equipped with three windings 46, 47 and 48. The two windings 47 and 48 counteract and balance one another when they are equally energized. In this event, no torques are produced. The two windings 46 are arranged in series and are connected between the phase T and the central tap 49 of an inductance coil 50 inserted between the phases R and S. In this way, the windings 46 are constantly energized. The counteracting windings 47 and 48 have their joined terminals connected through wires 51 and through an adjustable resistance 52 with the phase R. The other terminals of the windings 47 and 48, however, are connected with the electrodes 21, 22, 23 and 24. The housing 35, 36 of the level 33 is connected through a line 53 with the phase S which may be grounded. The resistance offered by the liquid 2 to the passage of current between the housing and the individual electrodes 21, 22, 23 and 24 will vary depending on the position of the air bubble 6, Fig. 6. When this air bubble departs from its central position shown in Fig. 6, it will so unbalance the energization of the windings 47 and 48 as to cause the torque to be produced that is required to control the gyroscope axis in the desired manner. The rate of the torque may be controlled by the adjustable resistance 52. It will be readily understood that in this manner the two torque producers 17 and 18 may be controlled simultaneously and independently by the single level. Thus, when the bubble should move from its central position towards the electrode 21 and away from the electrode 24 while keeping equal distances from the electrodes 22 and 23, it will start the motor 17 only without, however, starting the motor 18 at the same time. If the bubble, however, should approach the electrodes 21 and 22 at the same time while receding from the electrodes 23 and 24, the two torque producers 17 and 18 would be unbalanced simultaneously so as to produce torques.

Figure 8:
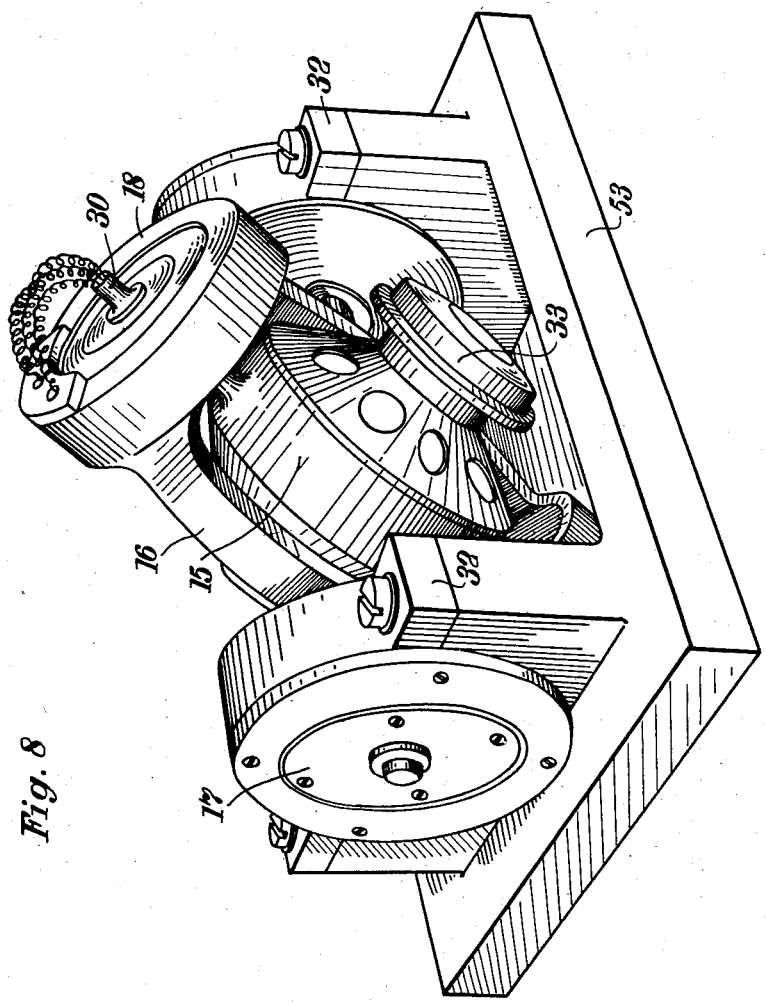
Fig. 8 is a perspective view of the instrument diagrammatically shown in Fig. 5.

While Fig. 5 is a very diagrammatic illustration of the instrument only, I have shown a practical embodiment thereof in Fig. 8. The frame 53 of the instrument carries the bearings 32 for the gimbal ring 16 which, in its turn, carries the bearings for the trunnions 30 of the gyroscope carrier 15. The torque producers or motors 17 and 18 are arranged as above described. It is to be understood, of course, that in normal operation the gyroscope carrier 15 is so positioned as to hold the spinning axis of the gyroscope in vertical position. In Fig. 8 it is shown in abnormal position for a better illustration of the torque producer 18.

While I have described my invention by reference to a number of specific embodiments thereof, I wish it to be clearly understood that my invention is by no means limited thereto but is capable of numerous modifications within the scope of the appended claims.

What I claim is:

1. In a device of the type described, a substantially closed casing adapted to be supported normally in one position, said casing having liquid current-carrying means therein of such quantity as to provide an insulating bubble between the upper surface thereof and the top of said casing, an electrode mounted in the lower portion of the casing so as to be immersed in said liquid means, and a second electrode mounted in said casing, said second electrode including surface forming means adjacent the upper wall of said casing and disposed at such an angle, with respect to the normal position of said casing, as to be at least partially in contact with said liquid means whereby when said casing is tilted from said normal position, movement of said insulating bubble over said surface means changes the area of contact between said surface means and said liquid means, one of said means being so constituted as to provide substantially greater resistance to the passage of electric current than the other of said means.

2. A continuously variable resistance device for controlling electric current passing therethrough in dependence on the position of the device with respect to apparent gravity and comprising a closed casing, liquid current-carrying means in said casing, electrode means provided in the casing, said electrode means being in flush relation with the inner surface of the casing, second electrode means located within the casing and immersed in said liquid means, said liquid means having an insulating bubble therein and one of said electrode means having a resistance to the passage of current that differs from that of said liquid means, the first electrode means and the bubble being positioned with respect to each other to have at least a portion of the bubble in contact with said first electrode means when the casing is in its normal position and to have the bubble moved over said surface of the first electrode means on tilting movement of the casing to change the contact area between the bubble and the first electrode means.

3. A continuously variable resistance device for controlling electric current passing therethrough in accordance with the inclination of the device with respect to its normal position comprising in combination a tiltably mounted closed casing, liquid current-carrying means in said casing, electrode means comprising a pair of electrodes located at the top of said casing, each electrode having a surface in flush relation to the inner surface of said casing, other electrode means comprising a single electrode located in the bottom of the casing and having a surface immersed in said liquid means, said liquid means having an insulating bubble formed therein, and one of said electrode means having a resistance to the passage of current which is different from the resistance of said liquid means, the path of movement of said bubble lying across said surfaces of said pair of electrodes, inclination of the casing causing movement of the bubble and variation in the area of the surfaces of the pair of electrodes contacted by the bubble.

4. A continuously variable resistance device as claimed in claim 3 wherein said surfaces of said pair of electrodes are spaced a distance apart which is less than the diameter of said bubble.

5. A continuously variable resistance device for controlling electric current passing therethrough in accordance with the inclination of the device with respect to its normal position comprising in combination a closed casing mounted for tilting movement relative to two axes lying in intersecting planes disposed at right angles to each other, liquid current-carrying means within the casing, two pairs of electrodes located at the top of said casing, each electrode having a surface in flush relation to the inner surface of the casing, the centers of said surfaces of one pair of electrodes lying in one of said planes and the centers of said surfaces of the other pair of electrodes lying in the other plane, said liquid means having a bubble therein which moves across said surfaces of said electrodes and is in contact therewith, each electrode surface of a pair of electrodes being spaced from the other electrode surface by a distance less than the diameter of the bubble, inclination of said casing causing movement of the bubble and variation of the area of said surfaces of the electrodes which is contacted by the bubble, said casing including means for conducting an electric current to said liquid means, and said electrodes having a resistance different from that of the liquid means.

6. In an instrument having a gyroscope and electrically actuated means for erecting the gyroscope, the combination of a continuously variable resistance means in circuit with the erecting means and responsive to the inclination of the gyroscope for controlling the actuation of said erecting means, said device comprising a closed casing, liquid current-carrying means in said casing, electrode means in the top of said casing, said electrode means being in flush relation to the inner surface of said casing, second electrode means located within the casing and immersed in said liquid means, said liquid means having an insulating bubble therein and one of said electrode means having a resistance to the passage of current that differs from the resistance of said liquid means, the first electrode means and the bubble being positioned with respect to each other to have at least a portion of the bubble in contact with said first electrode means when the casing is in its normal position and to have the bubble moved over said first electrode means on inclination of the casing to change the contact area between the bubble and the said surface of the first electrode means.

7. A continuously variable resistance device for controlling electric current passing therethrough in dependence on the position of the device with respect to apparent gravity and comprising a closed casing, liquid current-carrying means in said casing, an electrode in the top of said casing, said electrode having a surface in flush relation with the inner surface of the casing, a second electrode means located within the casing and having a surface immersed in said liquid means, said liquid means having an insulating bubble therein, the first electrode and the bubble being positioned with respect to each other to have at least a portion of the bubble in contact with said surface of the first electrode when the casing is in its normal position and to have the bubble moved over said surface of the first electrode on tilting of the casing to change the contact area between the bubble and the said surface of the first electrode, one of said electrodes having a resistance to the passage of current which is different from the resistance of the liquid means in said casing.

HEINRICH KÜNZER.